March 29, 1960   A. S. BASS ET AL   2,930,391
VEHICLE BRAKE LINE VALVE
Filed Aug. 3, 1956

Alton S. Bass
Robert L. Bass
INVENTORS,

BY *[signatures]*
Attorneys

United States Patent Office

2,930,391
Patented Mar. 29, 1960

2,930,391

VEHICLE BRAKE LINE VALVE

Alton S. Bass and Robert L. Bass, Oklahoma City, Okla.

Application August 3, 1956, Serial No. 601,931

4 Claims. (Cl. 137—118)

This invention relates in general to new and useful improvements in hydraulic brake systems for vehicles, and more specifically to a vehicle brake line valve.

The average hydraulic brake system of vehicles includes four individual wheel brakes, with each of the wheel brakes being provided with an individual wheel cylinder. The hydraulic brake system also includes a master brake cylinder which is actuated by the foot pedal. The master brake cylinder is connected to the individual wheel cylinders by hydraulic lines which is normally in the form of tubing. The existing hydraulic brake systems are such that when one of the individual wheel cylinders or one of the hydraulic lines develops a leak, each time the master brake cylinder is actuated, hydraulic fluid is pumped through the leak, with the result that the brakes of the brake system are ineffectual and eventually sufficient hydraulic fluid is pumped through the leak to prevent the actuation of the brakes and the failure of the brake system.

It is therefore the primary object of this invention to provide a valve which may be placed in the lines of a hydraulic brake system, the valve being so situated whereby a line for the rear individual wheel cylinders extends on one side thereof and the line for the individual wheel cylinders extends from the opposite side thereof, the valve being of such nature whereby, when the pressure in one of the lines becomes reduced due to a leak, the valve automatically shuts off the flow of hydraulic fluid to that line so that the leak is sealed and either two of the front wheels or two of the rear wheels of the vehicle continue to have brakes.

Another object of this invention is to provide an improved valve for use in a hydraulic brake system, the valve being so constructed whereby it has connected to opposite sides thereof inlets and outlets, the valve being of the type which operates on a differential pressure so as to normally remain in a neutral position when the pressures on opposite sides are equal and to move to the side of lower pressure when there is a differential in pressure so as to seal the outlet at that side and prevent the escape of fluid.

A further object of this invention is to provide an improved valve for use in conjunction with hydraulic brake systems, the valve including a housing having mounted therein a centrally disposed diaphragm, there being connected to the housing on opposite sides of the diaphragm inlet lines and outlet lines, the diaphragm carrying valve portions which are engageable with valve seats in the opposite sides of the housing for automatically closing one of the outlets upon the reduction of pressure within the housing on the side of the particular outlet.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figures 1, 2, 3, 4:
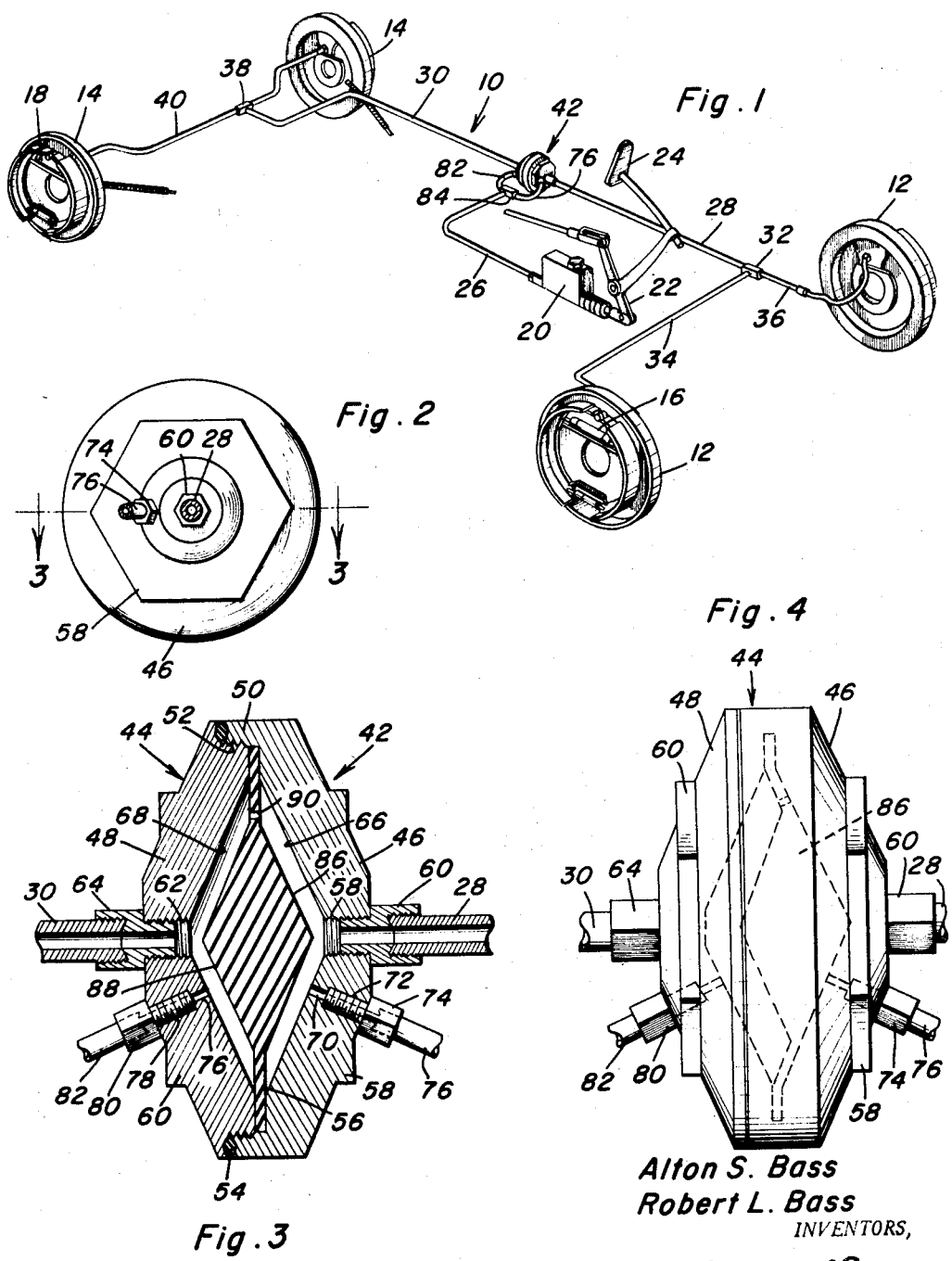
Figure 1 is a perspective view of a hydraulic brake system showing mounted therein the valve which is the subject of this invention.
Figure 2 is an enlarged end view of the valve and shows the general arrangement of brake lines connected thereto.

Figure 3 is an enlarged vertical sectional view taken substantially upon the plane indicated by the section line 3—3 of Figure 2 and shows the specific details of the valve including the arrangement of the brake lines relative thereto; and Figure 4 is an enlarged plan view of the valve and shows the diaphragm thereof shifted for sealing one of the brake lines due to a differential in pressure on opposite sides of the diaphragm.

Referring now to th drawings in detail, it will be seen that there is illustrated in Figure 1 a vehicle hydraulic brake system which is referred to in general by the reference numeral 10. The hydraulic brake system 10 includes a plurality of individual front wheel brakes 12 and a pair of individual rear wheel brakes 14. Each of the front wheel brakes 12 includes an individual wheel cylinder 16. Each of the rear wheel brakes 14 includes an individual wheel cylinder 18.

The hydraulic brake system 10 also includes a master brake cylinder 20 which is actuated by suitable linkage 22 to which there is connected a brake pedal 24. Extending from the master brake cylinder 20 is a main supply line 26 which is connected to a forwardly extending supply line 28 and a rearwardly extending supply line 30. The forwardly extending supply line 28 is provided with a fitting 32 to which there is connected a transverse line 34 which in turn is connected to the wheel cylinder 16 of the right front brake 12. Also connected to the fitting 32 is a supply line 36 which is connected to the wheel cylinder 16 of the left front brake 12. The rearwardly extending supply line 30 is provided at its rear end with a fitting 38 which has connected thereto a transversely extending line 40 whose opposite ends are connected to the wheel cylinders 18 of the rear wheel brakes 14.

Disposed intermediate the forwardly extending brake line 28 and the rearwardly extending brake line 30 is a valve which is the subject of this invention, the valve being referred to in general by the reference numeral 42. Referring to Figure 3 in particular, it will be seen that the valve 42 includes a housing which is referred to in general by the reference numeral 44. The housing 44 is formed of a pair of halves 46 and 48 which are very similar and which differ only in that the half 46 is provided with an internally threaded portion 50, whereas the half 48 is provided with a complementary externally threaded portion 52. The threaded portions 50 and 52 are disposed in mating engagement and serve to secure the halves 46 and 48 together. A sealing ring 54 is disposed between the halves 46 and 48 to make the housing 44 fluid tight.

Disposed between the halves 46 and 48 within the interior of the housing 44 is a circular diaphragm 56. The diaphragm 56 has a peripheral portion clamped between the halves 46 and 48. The halves 46 and 48 are provided with nut portions 58 and 60 to facilitate the tightening thereof to clamp the diaphragm 56 therebetween.

The half 46 is provided with a central, internally threaded bore 58 in which there is threaded a fitting 60. The fitting 60 connects to the valve 42 the forwardly extending brake line 28.

The half 48 on the housing 44 is provided with a centrally disposed, internally threaded bore 62 which opposes the bore 58 in which there is threadedly engaged therein a fitting 64. The fitting 64 serves to connect to the valve 42 the rearwardly extending brake line 30.

The half 46 has an internal surface which is of a frusto-conical configuration, the internal surface forming a valve seat 66. A similar valve seat 68 is formed by the internal surface of the half 48. Extending through the valve seat 66 normal to the surface thereof is a small bore 70 which is a continuation of an enlarged internally threaded bore 72. Threadedly engaged in the bore 72 is a fitting 74 which serves to connect an inlet line 76 to the valve 42, and more particularly to the half 46.

A small bore 76 opens into the interior of the housing 44 through the half 48. The other part of the bore 76 includes an enlarged internally threaded bore 78 in which there is threadedly engaged a fitting 80. The fitting 80 connects to the half 48 and inlet line 82.

Referring once again to Figure 1 in particular, it will be seen that the inlet lines 76 and 82 are arranged in yoke fashion and are connected to the main supply line 26 from the master brake cylinder by means of a fitting 84. Thus, hydraulic brake fluid under pressure from the master brake cylinder 20 is delivered to opposite sides of the valve 42 when the brake system 10 is energized.

In the normal operation of the valve 42, hydraulic brake fluid under pressure enters into the housing 44 on one side of the diaphragm 56 through the bore 70 and out through the fitting 60. Similar hydraulic fluid enters into the opposite side of the housing 44 through the bore 76 and out through the fitting 64. As long as the pressure of the hydraulic fluid on opposite sides of the diaphragm 56 is equal, the diaphragm 56 assumes its central position. However, when a break develops, the pressure on one side of the diaphragm 56 will be reduced and, as a result, the differential in pressure on opposite sides of the diaphragm will result in the shifting of the diaphragm towards the low pressure side. The diaphragm 56 is provided on one side thereof with a conical valve portion 86 which corresponds to the valve seat 86. The opposite side of the diaphragm 56 is provided with a conical valve portion 88 which corresponds to the valve seat 68. In order that fluid may bleed from one side of the diaphragm 56 to the other during the shifting thereof, there is provided a small bleed opening 90 in the diaphragm 56.

When the pressure differential on one side of the diaphragm 56 is such to cause movement of the diaphragm, as is illustrated in Figure 4, the particular valve portion will engage its valve seat and thus close off the supply of hydraulic brake fluid to one of the lines 28 and 30. However, when the valve 42 is actuated, the brake system 10 does not fail completely, as in the instance of the average brake system, but permits two of the wheel brakes to continue to function so that the vehicle has sufficient brakes to be moved pending repairs.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combination connecting fitting and valve for use in a hydraulic brake system for connecting two independent brake lines to a hydraulic master brake cylinder and for automatically closing one of said brake lines upon the development of a leak in the one brake line, said valve comprising a two-piece housing which includes first and second halves, a central diaphragm disposed in said housing and clamped between said halves, said diaphragm being symmetrical about the center thereof and including valve portions carried by opposite faces thereof, said valve portions extending across a major part of the central portion of the diaphragm and being substantially conical in outline, opposed outlet passages in said housing on opposite sides of said diaphragm, said outlet passages being aligned with the center of said diaphragm, a valve seat formed in said housing, around each of said outlet passages, each of said valve seats forming a major portion of the internal surface of one of said housing halves and being of a substantially frusto-conical outline, said valve seats being aligned with and complementary to said valve portions with the opposed surfaces of said seats and said valve portions being substantially parallel, an inlet passage in each of said housing halves, each of said inlet passages opening through said valve seat of its corresponding housing half whereby said inlet passage and said outlet passage of either of said housing halves may be simultaneously sealed upon reduction in pressure on one side of said diaphragm which results in movement of said diaphragm to engage said valve portion with the valve seat of the corresponding housing half.

2. A combination connecting fitting and valve for use in a hydraulic brake system for connecting two independent brake lines to a hydraulic master brake cylinder and for automatically closing one of said brake lines upon the development of a leak in the one brake line, said valve comprising a two-piece housing which includes first and second halves, a central diaphragm disposed in said housing and clamped between said halves, said diaphragm being symmetrical about the center thereof and including valve portions carried by opposite faces thereof, said valve portions extending across a major part of the central portion of the diaphragm and being substantially conical in outline, opposed outlet passages in said housing on opposite sides of said diaphragm, said outlet passages being aligned with the center of said diaphragm, a valve seat formed in said housing around each of said outlet passages, each of said valve seats forming a major portion of the internal surface of one of said housing halves and being of a substantially frusto-conical outline, said valve seats being aligned with and complementary to said valve portions with the opposed surfaces of said seats and said valve portions being substantially parallel, an inlet passage in each of said housing halves, each of said inlet passages opening through said valve seat of its corresponding housing half whereby said inlet passage and said outlet passage of either of said housing halves may be simultaneously sealed upon reduction in pressure on one side of said diaphragm which results in movement of said diaphragm to engage said valve portion with the valve seat of the corresponding housing half, and a bypass opening through said diaphragm remote from said inlet passages for bleeding hydraulic fluid from one side of said diaphragm to the other side of said diaphragm upon movement of said diaphragm.

3. A combination connecting fitting and valve for use in a hydraulic brake system for connecting two independent brake lines to a hydraulic master cylinder and for automatically closing one of said brake lines upon the development of a leak in the one line, said valve comprising a two-piece housing including first and second halves, a central diaphragm disposed in said housing and clamped between said halves, said diaphragm being symmetrical about the center thereof and having enlarged valve portions carried by opposite faces thereof, said valve portions extending across a major part of the central portion of the diaphragm and being regular in outline, opposed outlet passages in said housing on opposite sides of said diaphragm, said outlet passages being aligned with the center of said diaphragm, a valve seat formed in said housing around each of said outlet passages, each of said valve seats forming a major portion of the internal surface of one of said housing halves and being of regular shape in outline, said valve seats being aligned with and complementary to said valve portions with the opposed surfaces of said seats and said valve portions being substantially parallel, an inlet passage in each of said housing halves, each of said inlet passages opening through said valve seat of its corresponding housing half whereby said inlet passage and said outlet passage of either of said housing halves may be simultaneously sealed upon reduction in pressure on one side of said diaphragm which results in movement of said diaphragm to engage the valve portion with the valve seat of the corresponding housing half.

4. The combination of claim 3 including a by-pass opening through said diaphragm remote from said inlet passages for bleeding hydraulic fluid from one side of said diaphragm to the other side of said diaphragm upon movement of said diaphragm.

References Cited in the file of this patent

UNITED STATES PATENTS

| | | |
|---|---|---|
| 2,246,621 | Davis | June 29, 1941 |
| 2,604,900 | Hewitt | July 29, 1952 |
| 2,710,620 | Watson | June 14, 1955 |
| 2,723,798 | Straitiff | Nov. 15, 1955 |
| 2,736,332 | Simmons | Feb. 28, 1956 |
| 2,778,373 | Jaquith | Jan. 22, 1957 |

FOREIGN PATENTS

| | | |
|---|---|---|
| 361,532 | Great Britain | Nov. 26, 1931 |
| 539,895 | Great Britain | Sept. 29, 1941 |